United States Patent
Blackburn

(10) Patent No.: US 6,801,020 B2
(45) Date of Patent: Oct. 5, 2004

(54) CURRENT RESPONSE CONTROLLER FOR STARTER/ALTERNATOR

(75) Inventor: Scott Evart Blackburn, Temperance, MI (US)

(73) Assignee: Dana Corporation, Toledo, OH (US)

(*) Notice: Subject to any disclaimer, the term of this patent is extended or adjusted under 35 U.S.C. 154(b) by 50 days.

(21) Appl. No.: 10/303,721

(22) Filed: Nov. 26, 2002

(65) Prior Publication Data

US 2004/0100228 A1 May 27, 2004

(51) Int. Cl.[7] .............. H02H 7/06; H02J 7/14; H02P 9/00; H02P 9/30
(52) U.S. Cl. .............. 322/25; 322/19; 322/24; 322/28; 290/40 A; 290/40 C
(58) Field of Search .............. 322/19, 24, 25, 322/28; 290/40 A, 40 C

(56) References Cited

U.S. PATENT DOCUMENTS

| | | | | |
|---|---|---|---|---|
| 3,991,357 A | * | 11/1976 | Kaminski | 322/10 |
| 4,687,983 A | * | 8/1987 | Beyn | 322/28 |
| 4,749,944 A | | 6/1988 | Okamoto | 324/158 MG |
| 4,973,896 A | * | 11/1990 | Shiga et al. | 322/28 |
| 5,293,076 A | | 3/1994 | Fukui | 290/40 C |
| 5,336,932 A | | 8/1994 | Barske | 290/1 R |
| 5,491,404 A | * | 2/1996 | Settles et al. | 323/283 |
| 5,559,704 A | * | 9/1996 | Vanek et al. | 701/99 |
| 5,621,304 A | * | 4/1997 | Kiuchi et al. | 322/18 |
| 5,801,516 A | * | 9/1998 | Rice et al. | 322/37 |
| 5,929,609 A | * | 7/1999 | Joy et al. | 322/25 |
| 6,014,015 A | * | 1/2000 | Thorne et al. | 322/15 |
| 6,175,217 B1 | * | 1/2001 | Da Ponte et al. | 322/19 |
| 6,184,661 B1 | | 2/2001 | Becker et al. | 322/25 |
| 6,188,203 B1 | * | 2/2001 | Rice et al. | 322/25 |
| 6,274,942 B1 | | 8/2001 | Pels | 290/40 B |
| 6,274,943 B1 | * | 8/2001 | Hasegawa et al. | 290/40 C |
| 6,707,170 B2 | * | 3/2004 | Fukaya | 290/40 A |
| 6,744,149 B1 | * | 6/2004 | Karuppana et al. | 307/31 |
| 6,745,117 B1 | * | 6/2004 | Thacher et al. | 701/50 |

* cited by examiner

Primary Examiner—Joseph Waks
Assistant Examiner—Pedro J. Cuevas
(74) Attorney, Agent, or Firm—Liniak, Berenato & White

(57) ABSTRACT

The system is directed to preserving an IC engine installation from potential overload and failure in response to electrical load increases passed along by an associated engine driven digitally controlled starter/alternator. The system controller monitors starter/alternator output and phase current and/or regulates the rate of change of output current in response to increasing electrical load. In an instance where monitored rates of output current change exceed predetermined thresholds, the response rate of the starter/alternator, i.e., rate of change of output current, is set at a predetermined threshold so as to prevent the braking effect of the increasing electrical load from stalling the I.C. engine or causing other operational failure.

3 Claims, 2 Drawing Sheets

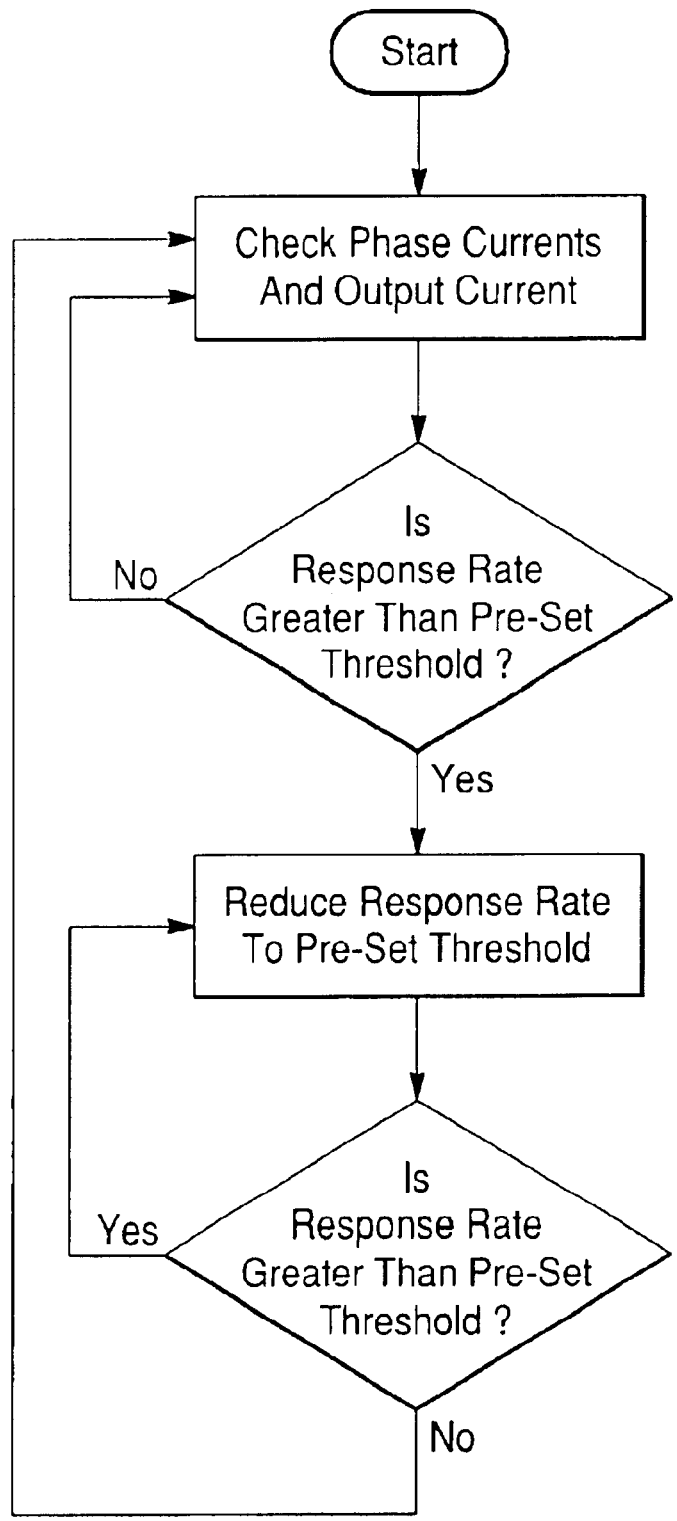

CURRENT RESPONSE CONTROLLER FOR STARTER/ALTERNATOR

FIELD OF THE INVENTION

The invention relates to the field of automotive electrical systems. Specifically, the invention is directed to a method of limiting the rate of change of the output current supplied by a starter/alternator in the generator mode in the circumstance where the system load, i.e., demand for electrical energy, has rapidly increased. The method of the present invention limits the rate at which the output current can increase thereby limiting the possibility that the rapidly increasing electrical load could either stall or cause another operational fault in the associated I.C. engine.

BACKGROUND OF THE INVENTION

The trend in automotive electrical systems has always been towards more power and higher voltages. At this time, an element of the trend involves the combination of the alternator and starter into a single IC engine driven unit. This combined starter/alternator can be driven either directly on the crankshaft of the IC engine as a part of the flywheel, on one end, or the balancer, on the other. Alternatively, the starter/alternator can be mounted for gear, belt, or chain drive from the crankshaft along with other IC engine driven components (i.e., waterpump/A/C compressor/power steering pump, etc.)

The starter/alternator has become more powerful not only for increasing power (current and voltage) but also for more rapid and more frequent starting cycles of the IC engine as enhanced operating efficiencies are sought. In pursuit of these goals, the starter/alternator has become more sophisticated in its control systems and its responsiveness to system requirements for both starter functions and generating functions.

In older fixed output alternator/generators (i.e., approximately 1000 watts in a range of pre-selected engines speeds), the excess load would simply divert to the battery, or other electrical power storage device, for increased current requirements and, similarly, excess output would also divert. [Either of these eventualities led to either dimming lights and decreasing performance of electrical components, in the case of too small an alternator and a weakened battery condition, or boiled away battery fluids in the case of too large a charging capacity!]

However, in the event a modern starter/alternator is not controlled properly, the combined starter/alternator is generally sufficiently load responsive and powerful to stall an IC engine that is operating at low or idle speeds. That is, the braking effect of the rapidly increasing requirement for electrical output from the starter/alternator may overwhelm the available torque of the I.C. engine.

SUMMARY OF THE INVENTION

The present invention is directed to controlling the rate of change in the output current of a combined starter/alternator in response to rapidly increasing demand loads such that the starter/alternator does not overload the I.C. engine resulting in a stall condition. In this method, the current in the starter/alternator motor phases and/or the output current from the starter/alternator inverter is monitored. Once the monitored current reaches a rate of change (i.e., response rate) that exceeds a predetermined threshold response rate, the rate of change of the output voltage of the starter/alternator is regulated and reduced to maintain the output at the predetermined threshold rate of output current change (response rate).

BRIEF DESCRIPTION OF THE DRAWINGS

FIG. 2 shows a flow chart of decision making for the method used by the system controller in the present invention to determine the rate of change of current output and to regulate and set the associated response rate to prevent I.C. engine overload.

DETAILED DESCRIPTION

Figure 1:
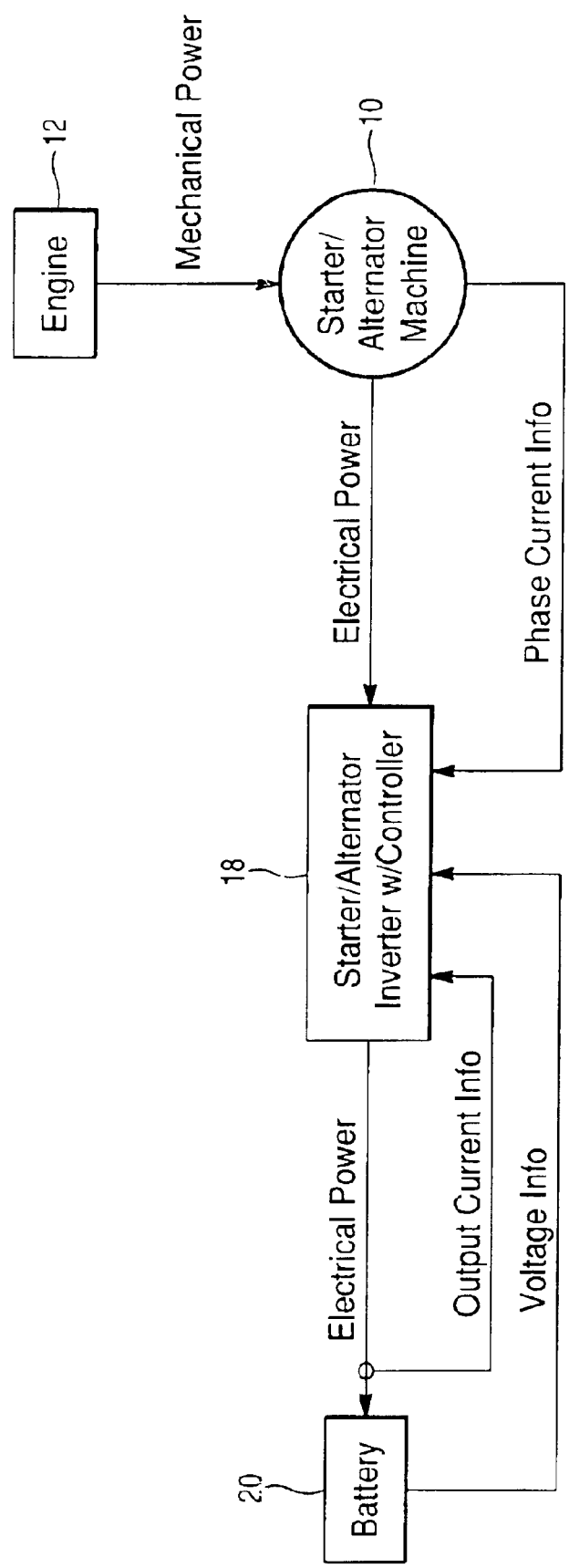
FIG. 1 shows a block diagram of the necessary sensors and hardware to accomplish the present method.

The present invention is directed to a method of controlling a starter/alternator 10 associated with an IC engine 12. The starter/alternator 10 and IC engine 12 form a part of the motive system for a vehicle that has additional electrical components that create electrical load for the starter/alternator 10 to supply. The inverter/controller 18 controls the output of the starter/alternator as the output flows into the electrical system of the vehicle that also includes an electrical storage device 20 (battery).

In operation, the controller 18 monitors the phase currents and output current of the starter/alternator 10. As electrical load increases (i.e., A/C blowers switched to high for defrost and, at the same time, activating seat heaters, rear window heater, rear side view mirror heaters, and fast acting catalyst start-up heater), the output of the starter/alternator is increased by the controller accordingly. If the controller detects a rate of current output change exceeding a predetermined threshold response rate, the response rate is reduced to a predetermined threshold response rate, ie, 50 A per second, the respective phase and output currents are again monitored to determine if the response rate still exceeds a predetermined threshold, if yes, the response rate is again stepped down to the predetermined threshold response rate.

The method of the present invention can be activated in response to a rapidly increasing demand for electrical power created by load cycling into the system, or by heavy charging demands of a depleted storage device, or by a failed electrical component (shorted or other load generating malfunction). In any instance, and regardless of the reason, the starter/alternator is prevented from too rapid an increase in output current thereby overloading the I.C. engine torque supply and creating a stall or other malfunction condition in the I.C. engine.

The specified threshold for an acceptable rate of output current change may vary according to the capacity and operating characteristic of the starter/alternator and the associated IC engine system. For example, if the IC engine has low torque characteristics, i.e., is a two stroke I.C. engine or is of a relatively small displacement (motorcycle), the acceptable rate of output current change may be as low as 10 A per second. On the other hand, if the IC engine has a very strong low speed torque characteristic, i.e., a large displacement turbo diesel, a much higher rate of output current change may be tolerated and that rate of change may be as high as 100 A per second. Other operational factors may also be present to offset the acceptable rate of change of output current, for example, whether the vehicle is moving and whether the IC engine itself is being driven by vehicle momentum (i.e., traveling downhill or coasting) whereby even if the IC engine speed is relatively low, the torque characteristic to drive the starter/alternator may nonethe-less be ample. The factors, and others, will be apparent to one of ordinary skill in the field starter/alternator operation upon a reading of this specification.

I claim:

1. A method of preventing overload failure of an I.C. engine in a system including an IC engine driven starter/alternator in an IC engine installation, comprising the steps of:

monitoring at least one of either phase current or output current of said starter/alternator in response to increasing electrical load on said starter/alternator and obtaining a monitored value for a rate of change of said phase current or output current;

comparing said monitored value for said rate of change to a predetermined threshold response rate for said starter/alternator;

reducing said response rate of said starter/alternator when said monitored response rate exceeds said predetermined threshold value to keep said monitored current value at or below said predetermined threshold response rate.

2. A method as in claim 1, wherein:

said threshold response rate is variable and is selected according to the available torque characteristic of the IC engine taking into account operational parameters of said IC engine.

3. A method as in claim 2, wherein:

said predetermined threshold response rate is between 10 A/second to 100 A/second.

* * * * *